(12) United States Patent
Wengerter et al.

(10) Patent No.: US 8,644,226 B2
(45) Date of Patent: Feb. 4, 2014

(54) RESOURCE BLOCK CANDIDATE SELECTION TECHNIQUE EMPLOYING PACKET SCHEDULING IN WIRELESS COMMUNICATION SYSTEMS

(75) Inventors: Christian Wengerter, Langen (DE); Joachim Löhr, Langen (DE)

(73) Assignee: Panasonic Corporation, Osaka (JP)

( * ) Notice: Subject to any disclaimer, the term of this patent is extended or adjusted under 35 U.S.C. 154(b) by 875 days.

(21) Appl. No.: 12/162,589

(22) PCT Filed: Jan. 25, 2007

(86) PCT No.: PCT/EP2007/000648
§ 371 (c)(1),
(2), (4) Date: Nov. 17, 2008

(87) PCT Pub. No.: WO2007/096038
PCT Pub. Date: Aug. 30, 2007

(65) Prior Publication Data
US 2009/0219870 A1  Sep. 3, 2009

(30) Foreign Application Priority Data
Feb. 24, 2006  (EP) .................................... 06003825

(51) Int. Cl.
*H04B 7/212* (2006.01)
*H04B 7/216* (2006.01)
*H04W 4/00* (2009.01)
*H04J 1/00* (2006.01)

(52) U.S. Cl.
USPC ........... 370/329; 370/322; 370/335; 370/341; 370/343

(58) Field of Classification Search
USPC .......... 370/348, 322, 329, 335, 336, 341, 343
See application file for complete search history.

(56) References Cited

U.S. PATENT DOCUMENTS 6,868,277 B1 *  3/2005  Cerwall et al. ................ 455/509
7,058,134 B2 *  6/2006  Sampath ....................... 375/260

(Continued)

FOREIGN PATENT DOCUMENTS

| CN | 1379600 | 11/2002 |
|---|---|---|
| EP | 1 237 292 | 9/2002 |

(Continued)

OTHER PUBLICATIONS

Chinese Office Action dated Feb. 24, 2011 with English Translation.

(Continued)

*Primary Examiner* — Noel Beharry
*Assistant Examiner* — Kodzovi Acolatse
(74) *Attorney, Agent, or Firm* — Seed IP Law Group PLLC

(57) ABSTRACT

A method of transmitting data packets over a plurality of dynamically allocated resource blocks in at least one or a combination of a time, code or frequency domain on a shared channel of a wireless communication system, comprising the steps of selecting a number of resource block candidates for potential transmission of data packets destined for a receiver and transmitting the data packet to the receiver using at least one allocated resource block from the selected resource block candidates. The invention also relates to a corresponding method of decoding data packets, a transmitter, receiver and communication system.

17 Claims, 14 Drawing Sheets

(56) References Cited

U.S. PATENT DOCUMENTS

| | | | |
|---|---|---|---|
| 7,385,954 B2* | 6/2008 | Gopalakrishnan et al. | 370/335 |
| 2003/0081692 A1 | 5/2003 | Kwan et al. | |
| 2003/0223398 A1* | 12/2003 | Haim et al. | 370/342 |
| 2004/0199846 A1 | 10/2004 | Matsumoto et al. | |
| 2006/0019672 A1* | 1/2006 | Kolding et al. | 455/452.2 |
| 2007/0097927 A1* | 5/2007 | Gorokhov et al. | 370/335 |

FOREIGN PATENT DOCUMENTS

| | | |
|---|---|---|
| EP | 1 248 479 | 10/2002 |
| EP | 1 492 258 | 12/2004 |
| GB | 2 387 751 | 10/2003 |
| JP | 2003-344360 | 11/2002 |
| JP | 2003-309535 | 10/2003 |
| JP | 2004-536505 | 12/2004 |
| WO | 03/001681 | 1/2003 |
| WO | 03/084108 | 10/2003 |

OTHER PUBLICATIONS

International Search Report dated May 3, 2007.
Japanese Office Action dated Jan. 24, 2012 with English Translation.
"3rd Generation Partnership Project; Technical Specification Group Radio Access Network; Physical Layer Aspects for Evolved UTRA (Release 7)," Technical Report, 3GPP TR 25.814 V1.0.3, Feb. 2006, 80 pages.
Motorola, "E-UTRA Downlink Control Channel Structure and TP," R1-060378, Agenda Item: 13.1.3, 3GPP TSG RAN1#44, Denver, USA, Feb. 13-17, 2006, 7 pages.
Communication pursuant to Article 94(3) EPC, dated Jan. 9, 2013, for corresponding European Application No. 06 003 825.4-1237, 5 pages.
NTT DoCoMo, "Physical Channels and Multiplexing in Evolved UTRA Downlink," R1-050590, Agenda Item: 4.1, 3GPP TSG RAN WG1 Ad Hoc on LTE, Sophia Antipolis, France, Jun. 20-21, 2005, 24 pages.

* cited by examiner

RESOURCE BLOCK CANDIDATE SELECTION TECHNIQUE EMPLOYING PACKET SCHEDULING IN WIRELESS COMMUNICATION SYSTEMS

This invention relates to shared channel transmission employing packet-scheduling ARQ in mobile/wireless communication systems. It is particularly applicable to downlink transmission in an OFDMA (Orthogonal Frequency Division Multiple Access) system using (Automatic Repeat reQuest).

In wireless communication systems employing packet-scheduling, at least part of the air-interface resources are assigned dynamically to different users (mobile stations, MS). Those dynamically allocated resources are usually mapped onto at least one SDCH (Shared Data CHannel), where a SDCH corresponds to e.g. the following configurations:

One or multiple codes in a CDMA (Code Division Multiple Access) system are dynamically shared between multiple MS. Alternatively, one or multiple subcarriers (subbands) in an OFDMA system are dynamically shared between multiple MS.

Combinations of the above two configurations are realized in an OFCDMA (Orthogonal Frequency Code Division Multiplex Access) or a MC-CDMA (Multi Carrier-Code Division Multiple Access) system where codes and subcarriers (subbands) are dynamically shared between multiple MS.

FIG. 1 shows a packet-scheduling system on a shared channel for systems with a single SDCH. A PHY Frame reflects the smallest time interval at which the scheduler (PHY/MAC Scheduler) performs DRA (Dynamic Resource Allocation). Further, typically the smallest unit, which can be allocated, is defined by one PHY Frame in the time domain and by one code/subcarrier/subband in code/frequency domain. In the following, this unit is denoted as RB (Resource Block). It should be noted that DRA is performed in the time domain and in the code/frequency domain.

The main benefits of packet-scheduling are firstly multiuser diversity gain by TDS (Time Domain Scheduling). Assuming that the channel conditions of the users change over time due to fast (and slow) fading, at a given time instant the scheduler can assign available resources (codes in case of CDMA, subcarriers/subbands in case of OFDMA) to users having good channel conditions. A further benefit is dynamic user rate adaptation. Assuming that the required data rates by the users (services a user is running) change dynamically over time, the scheduler can dynamically change the amount of allocated resources per user.

For the 3$^{rd}$ Generation CDMA mobile communication systems, packet-scheduling has been introduced by HSDPA (High Speed Downlink Packet Access) for the 3GPP (UMTS) standard and by HDR (High Data Rate) for the 3GPP2 CDMA 2000 standard.

In addition to exploiting multiuser diversity in the time domain by TDS, in OFDMA multiuser diversity can also be exploited in the frequency domain by FDS (Frequency Domain Scheduling). This is because the OFDM signal is in the frequency domain constructed out of multiple narrowband subcarriers (typically grouped into subbands), which can be assigned dynamically to different users. By this, the frequency selective channel properties due to multipath propagation can be exploited to schedule users on frequencies (subcarriers/subbands) on which they have a good channel quality (multiuser diversity in frequency domain).

For practical reasons in an OFDMA system the bandwidth is divided into multiple subbands, which consist of multiple subcarriers. Typically, a subband consists of consecutive subcarriers. However, in some cases, it is desired to form a subband out of distributed non-consecutive subcarriers. The smallest unit on which a user may be allocated would have a bandwidth of one subband and a duration of one PHY frame (consisting of multiple OFDM symbols), which is denoted as a RB (Resource Block). A scheduler may also allocate one or more RBs to a user over multiple consecutive or non-consecutive subbands and/or PHY frames.

E.g. for 3GPP LTE (Long Term Evolution), see for instance, 3GPP, *Technical Report* 25.814; *Physical Layer Aspects for Evolved UTRA*, v. 1.0.3, February 2006, which is currently being standardized, a 10 MHz system may consist out of 600 subcarriers with a subcarrier spacing of 15 kHz, which may then be grouped into 24 subbands (each having 25 subcarriers) with each subband occupying a bandwidth of 375 kHz. Assuming, that a PHY frame has a duration of 0.5 ms, then a RB would span over 375 kHz and 0.5 ms.

As seen from the above, in order to exploit multiuser diversity and to achieve scheduling gain in frequency domain, the data for a given user should be allocated on RBs on which the user has a good channel condition. Typically, those RBs are close to each other and therefore, this transmission mode is in the following denoted as LM (Localized Mode). An example LM is shown in FIG. 2.

In contrast to the LM, in OFDMA the resources may also be allocated in a distributed manner in the frequency domain, in the following denoted as DM (Distributed Mode). The DM may be implemented in different ways, e.g., allocating a user (codeblock) on multiple distributed RBs, subcarriers or modulation symbols, and the RBs are shared by multiple DM users. Further, a user (codeblock) may be allocated on multiple distributed subcarriers or modulation symbols, which are punctured into a RB used also for LM.

The transmission in DM may be useful in the cases where the channel quality to the mobile stations (receivers) of the RBs is not known sufficiently well at the base station (transmitter), e.g. due to limited or poor CQI (Channel Quality Indicator) feedback and/or due to outdated CQI feedback (e.g. due to high Doppler). A further situation where DM may be used is when the data to be transmitted is delay critical and the transmission should be made robust by utilizing frequency diversity.

It may be noted, that in LM as well as in DM in a given PHY frame multiple codeblocks (transport-blocks in 3GPP terminology) may be allocated separately to the same user on different RBs, which may or may not belong to the same service or ARQ process. From a scheduling or DRA point of view this can be understood as allocating different users.

In the following, it will be focused on OFDMA LM (Localized Mode), where typically a codeblock is mapped on a single or multiple consecutive RBs. However, without loss of generality similar is valid for DM, other transmission modes or access schemes (e.g. CDMA).

In order to efficiently utilize the benefits from scheduling, packet scheduling is usually combined with fast LA (Link Adaptation) techniques such as AMC (Adaptive Modulation and Coding) and ARQ (Automatic Repeat request). Additionally, fast and/or slow power control may be applied.

Employing AMC (see 3GPP, *Technical Report* 25.814; *Physical Layer Aspects for Evolved UTRA*, v. 1.0.3, February 2006), the data rate per codeblock (i.e. per PHY Frame) for a scheduled user is adapted dynamically to the instantaneous channel quality of the respective allocated resource by changing the MCS (Modulation and Coding Scheme). Naturally, this requires a channel quality estimate at the transmitter for the link to the respective receiver.

In case of OFDMA, the MCS may be adapted per codeblock, which may span over multiple RBs (in time and/or frequency domain), or may be adapted per RB.

In order to improve the robustness of the packet data transmission and to recover from transmission errors caused by imperfect AMC operation, generally ARQ is used. ARQ introduces time diversity to the transmission.

A common technique for error detection/correction is based on ARQ schemes together with FEC (Forward Error Correction), called HARQ (Hybrid ARQ). If an error is detected within a packet by the CRC (Cyclic Redundancy Check), the receiver requests the transmitter to send additional information (retransmission) to improve the probability to correctly decode the erroneous packet.

A packet will be encoded with the FEC before transmission. Depending on the content of the retransmission and the way the bits are combined with the previously transmitted information three types of ARQ schemes are defined.

Type I: The erroneous received packets are discarded and a new copy of the same packet is retransmitted and decoded separately. There is no combining of earlier and later received versions of that packet.

Type II: The erroneous received packet(s) is (are) not discarded, instead are stored at the receiver and are combined with additional retransmissions for subsequent decoding. Retransmitted packets may contain additional redundancy bits (to lower the effective code rate), may contain (partly) identical bits to earlier transmissions (to increase reliability of transmitted bits) or may contain a combination of additional redundancy and repeated bits.

Note that the modulation scheme, code rate and/or the packet size may change between retransmissions. HARQ Type II is also known as Incremental Redundancy HARQ.

Type III: This type is as special case of Type II with the constraint that each retransmission is now self-decodable. This implies that the transmitted packet is decodable without the combination with previous transmissions. This is useful if some transmissions are damaged in such a way that almost no information is reusable. If all transmissions carry identical data this can be seen as a special case, called HARQ Type III with a single redundancy version (or Chase Combining).

The (H)ARQ protocol may be implemented in a synchronous or asynchronous manner. In the asynchronous ARQ mode, retransmissions may be allocated on any RB and there is no timing relation with respect to earlier transmission, i.e. retransmissions may be scheduled at any time after the transmitter has received an NACK (or an ACK timeout has occurred). Therefore, in case of OFDMA LM, TDS and FDS can be employed for retransmissions achieving scheduling gain by multiuser diversity in the time and the frequency domain. An example for asynchronous ARQ is shown in FIG. 3. Note that for illustration purposes in this and all following figures only one packet transmission to one user is shown.

In the synchronous ARQ mode, retransmissions happen based on a predefined timing relation with respect to the previous transmission and on a predefined RB. The predefined RB may be identical to the RB of the previous transmission or may be a RB defined according to a pattern. I.e. retransmissions are not scheduled and scheduling gain is not available. An example for synchronous ARQ with an ARQ RTT (Round Trip Time) of 4 PHY Frames and using the same RB for retransmissions is shown in FIG. 4.

In order to inform the scheduled users about their allocation status, transmission format and data related parameters Layer 1 and Layer 2 (L1/L2) control signaling needs to be transmitted along with one or multiple SDCHs (Shared Data Channels).

In 3GPP HSDPA (CDMA) the L1/L2 control signaling is transmitted on multiple SCCHs (Shared Control CHannels) in each PHY frame (TTI, 2 ms). Each transmitted SCCH carries information for one scheduled user, such as channelization-code-set, modulation scheme, transport-block size information, redundancy and constellation version, HARQ process information, new data indicator (similar to a HARQ sequence number) and user identity.

Generally, the information sent on the L1/L2 control signaling may be separated into two categories:

The SCI (Shared Control Information) part of the L1/L2 control signaling contains information related to the resource allocation and it should therefore be possible for all users to decode the SCI. The SCI typically contains the information on the user identity and the RB allocation.

Depending on the setup of other channels and the setup of the DCI (Dedicated Control Information), the SCI may additionally contain information such as ACK/NACK for uplink transmission, MIMO (Multiple Input Multiple Output) related information, uplink scheduling information, information on the DCI (resource, MCS, etc.).

The DCI part of the L1/L2 control signaling contains information related to the transmission format and to the transmitted data to a specific scheduled user. I.e. the DCI needs only to be decoded by the scheduled user. The DCI typically contains information on the modulation scheme and the transport-block size (or coding rate).

Depending on the overall channel configuration, the SCI format and the HARQ setup it may additionally contain information such as HARQ related information (e.g. HARQ process information, redundancy and constellation version, new data indicator), MIMO related information.

The L1/L2 control signaling may be transmitted in various formats:

A first possibility is to jointly encode SCI and DCI. For multiple users (code blocks), the SCIs and DCIs are jointly encoded. For a single user, the SCI and DCI are jointly encoded and transmitted separately for each user.

A second possibility to separately encode SCI and DCI. Hence, the SCIs (or DCIs) for multiple users are encoded jointly or each SCI or DCI is encoded for each user.

In case of having multiple SCI codeblocks (each SCI codeblock may contain SCIs for multiple users), the SCI codeblocks may be transmitted with different power, modulation, coding schemes and/or code rates (see 3GPP, *E-UTRA downlink control channel structure and TP*, R1-060378, February 2006).

From a logical point of view, the L1/L2 control signaling contained out of SCI and DCI may be seen e.g. as follows. A first option would be to have a single (shared) control channel with two parts (SCI and DCI). Alternatively, a single (shared) control channel (SCI), where the DCI is not a separate control channel, but part of the SDCH, i.e. mapped together with the data (same RB). Further, two separate control channels (SCI, DCI) could exist or multiple separate control channels, e.g. single SCI control channel and multiple DCI control channels, multiple SCI control channels and multiple DCI control channels or multiple SCI control channels, where the DCI is not a separate control channel, but part of the SDCH, i.e. mapped together with the data (same RB).

For the purpose of illustration only, the following of this description will focus on the cases when SCI and DCI are encoded separately, the DCIs are encoded per user (SCIs may be encoded per user or jointly for multiple users) and the DCIs are mapped together with the data (same RB).

Typically, the SCIs are mapped separately from the SDCH into the physical resources, whereas the DCI may be mapped separately from the SDCH or into the resources allocated for the SDCH. In the following, the latter case will be exemplified in FIG. 5, where the DCIs are mapped at the beginning of the first allocated RB.

Further, as an illustrative example, an OFDMA system with a SDCH (Shared Data CHannel), which employs TDS (Time Domain Scheduling) and FDS (Frequency Domain Scheduling), for LM (Localized Mode) transmission will be assumed.

As shown in FIG. 4, retransmissions in synchronous ARQ operation happen after a predefined timing of the previous transmission on a predefined RB. This implies that retransmissions are not scheduled and generally L1/L2 control signaling (SCI and DCI) is not needed for retransmissions. It should be noted that in some cases it might be beneficial to still transmit the DCI with retransmissions in order to adapt the transmission format (e.g. modulation scheme, code rate, codeblock size, redundancy version) for retransmissions. The benefit of no/reduced L1/L2 control signaling for retransmissions comes at the cost of lost scheduling gain by TDS and FDS for retransmissions. FIG. 6 shows the case including DCI for retransmissions.

As illustrated in FIG. 3, retransmissions in asynchronous ARQ operation are explicitly scheduled in time and frequency domain in order to achieve scheduling gain by multiuser diversity not only for initial transmissions but also for retransmissions. This has the drawback that for each retransmission L1/L2 control signaling needs to be transmitted, i.e. SCI and DCI have to be transmitted. If e.g. 20% of all transmissions in the system are retransmissions, the L1/L2 control signaling overhead compared to synchronous ARQ operation increases by the same amount. Additionally, in asynchronous ARQ the potential for DRX (Discontinuous Reception) is reduced since the user (receiver) may receive retransmissions at any time instant. Therefore, the potential for power saving is reduced. FIG. 7 shows an example.

In light of the disadvantages of the conventional communication systems, the object of the present invention is to provide a method of transmitting and decoding data packets, which increases the scheduling gain in the time, code or frequency domain and reduces the amount of signaling data for the transmissions. The object is solved by a method as set forth in the independent claims.

A further object is to provide a corresponding transmitter and receiver as well as an improved communication system. To this end, the invention provides a transmitter, receiver and communication system as defined by independent claims.

The proposed solution provides the benefits of asynchronous ARQ, where scheduling gain for retransmissions is available, while reducing required control signaling for retransmissions. This is achieved by defining some resource candidates for retransmissions, where the actually used resource is semi-blindly detected.

Hence, the invention underlies the idea of using resource block candidates for transmission and reception and to semi-blind decode the RB candidates in order to detect a data packet destined for the receiver.

According to a preferred embodiment, the resource block candidates contain dedicated control information allowing the receiver to distinguish a data packet destined for itself for those destined to other users.

According to a further preferred embodiment, the dedicated control information includes a signature or identity. According to another preferred embodiment, the resource block candidates are either pre-configured or depend on a feedback signal received from the user.

Alternatively, the RB candidates can be selected based on a previous transmission.

In conclusion, the invention can be seen as a "hybrid" or "soft" solution between synchronous and asynchronous ARQ transmission. With respect to the conventional and asynchronous ARQ operation, the invention keeps similar scheduling gain in the time and frequency or code domain without requiring the transmission of the SCI part of the control signaling for retransmissions. In contrast to synchronous ARQ operation, the invention achieves scheduling gain in the time and frequency or the code domain.

The invention will be further appreciated from the following description of preferred embodiments with reference to the accompanying figures:

FIG. 8 shows a flowchart for illustrating the transmitting method according to an embodiment of the invention.

In step 110, resource block candidates for potential transmission of a data packet to a receiver are selected. The plurality of resource blocks are dynamically allocated in at least one or a combination of a time, code or frequency domain, preferably the time/frequency or time/code domain.

Upon selecting the candidates, a data packet is transmitted (step 120) using at least one allocated RB from selected RB candidates in step 110.

Finally, the transmitter receives feedback information from the receiver on the transmitted data packets, such as acknowledgements or non-acknowledgements messages or a quality of channel information. Based on the feedback message, the transmitter may adapt or alter the selection strategy carried out in step 110 on the resource block candidates for the next transmission. In an ARQ system, the next transmission may be a retransmission step of at least a part of the previously transmitted data packet.

It should be clear to those skilled in the art that there is no necessity to change the selected candidates for each transmission and that a selection can be done on a "as needed" basis.

Further it will be appreciated from the below description that the selection can be alternatively based on previous transmissions or preconfigured schemes.

In addition, it is understood that there is no requirement for the receiver to send feedback on a regular basis, i.e. for each subsequent transmission.

Figure 9:
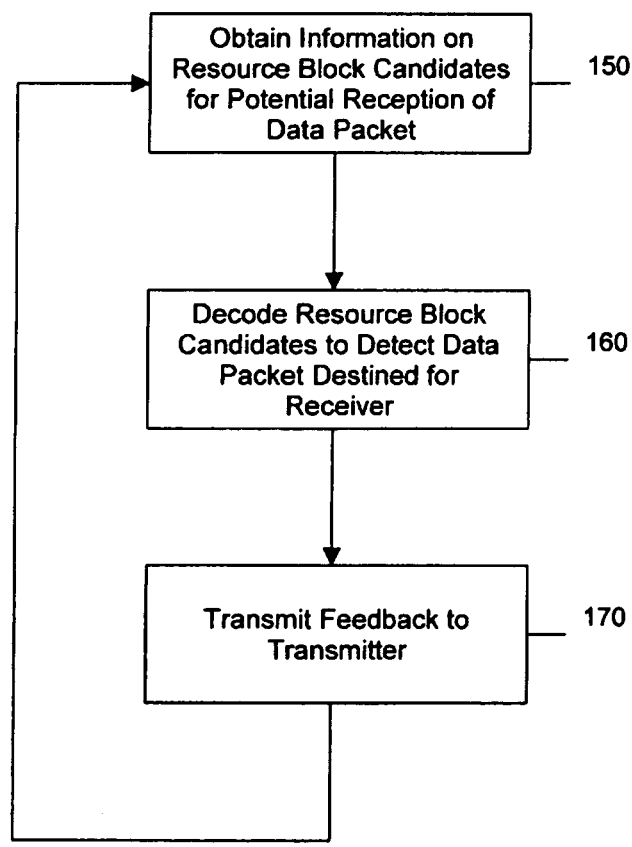
FIG. 9 shows a flowchart illustrating the decoding method according to an embodiment of the invention.

FIG. 9 illustrates the operational steps of the decoding method at the receiver according to a preferred embodiment.

In step 150, information on the resource block candidates for potential reception of a data packet is obtained. The candidates may either be pre-configured by the network for an individual user or receiver or determined based on e.g. measurements or other link parameters of the communication link.

In step 160, the receiver decodes all resource block candidates preferably parallel or in a series preferably according to a priority scheme to detect data packets destined for the receiver.

In step 170, the receiver transmits feedback to the transmitter to optimize the next transmission. The feedback may be interpreted by the transmitter as an instruction or recommendation for the selection strategy of resource block candidates.

Figure 10:
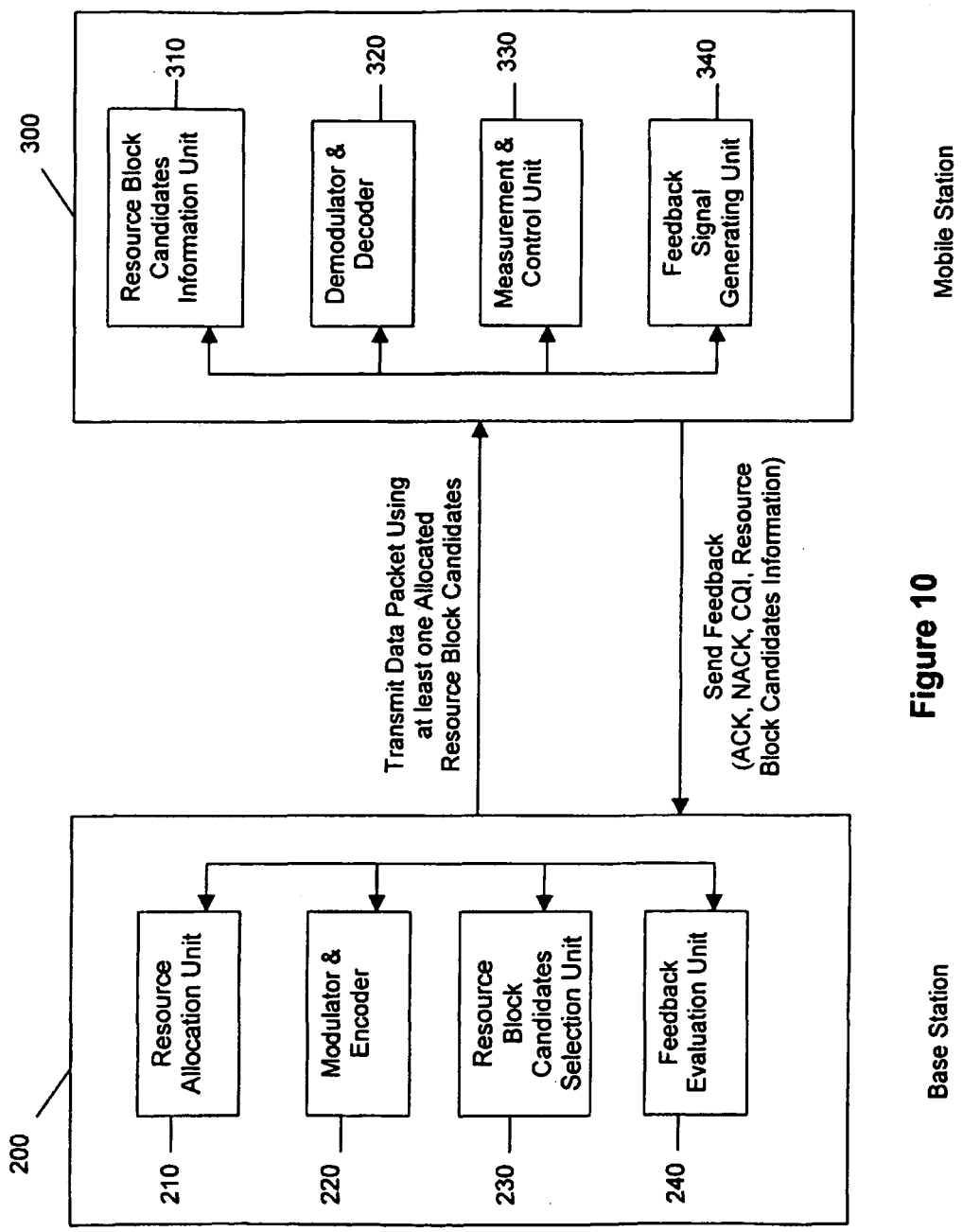
FIG. 10 shows an embodiment of the base station and mobile station according to the invention.

FIG. 10 shows a preferred embodiment for the transmitter embodied as a base station and a receiver embodied as a mobiles station of a wireless communication system.

The base station 200 comprises a resource allocation unit 210 for the dynamic allocation of resource blocks. In order to select the resource block candidates, it comprises a selection unit 230. In addition, a conventional modulator and encoder 220 provides mapping of the data packets on the allocated resource blocks for transmission over a wireless link to the receiver. For receiving feedback from the receiver as described above, a feedback evaluation unit 240 is also comprised in the base station. All above mentioned functional units are interconnected with each other by a conventional data bus and under control of a central control unit, which has been omitted in the figure for simplification purposes.

At the mobile station 300, corresponding functional components comprise a demodulator and decoder 320, a resource block candidates information unit 310. The information unit receives information on the selected resource block candidates either from the base station or network. Alternatively, it determines the information by itself. Further, a measurement and control unit 330 is able to perform the required communication link measurements and to detect a destined data packet. Finally, a feedback signal generating unit 340 provides a feedback signal, such as acknowledgement, non-acknowledgement or channel quality information to the base station. The feedback signal may also include information on the resource block candidate selection.

Figure 11:
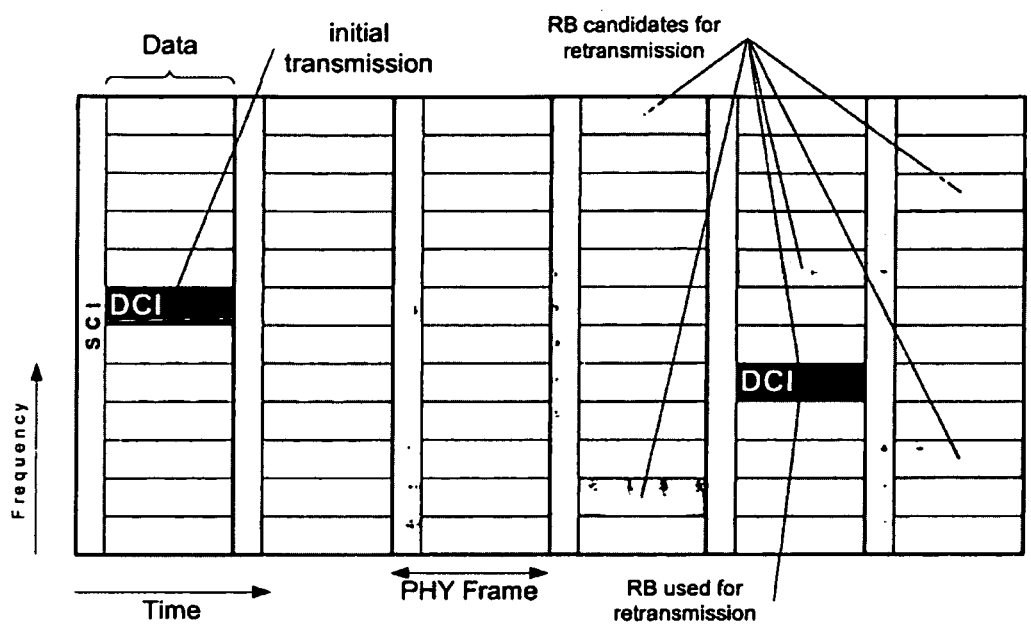
FIG. 11 illustrates an example including SCI/DCI signalling for asynchronous ARQ operation using the principles of the invention.

For the location in the time-frequency grid (RBs on different PHY frames) of ARQ retransmissions, a number for RB candidates are defined. Since the user (receiver) generally knows if a retransmission takes place (due to ACK/NACK transmission), the user tries to decode the potentially transmitted DCIs on the RB candidates and finds the RB on which the retransmission has actually been scheduled. This can be seen as a kind of semi-blind detection of retransmissions, i.e. a semi-blind detection of the DCIs associated with the retransmissions. Generally, the number of RB candidates should by significantly smaller than all theoretically possible RBs in case of asynchronous ARQ. An example is shown in FIG. 11.

As mentioned before, according to the preferred embodiment, it is assumed that the DCI is transmitted on the same resource (RB) as the data. Therefore, if a user identifies a DCI intended for it on one of the RB retransmission candidates, it can detect the retransmission data and try to decode the data. This implies that on the RB candidates, the receiver can distinguish a DCI intended for itself (correct DCI) from DCIs intended for other users, since RB candidates on which its own retransmission is not scheduled may be used for data to other users. The identification of the correct DCI may work e.g. as follows:

The DCI carries a signature or an identity based on which the receiver can detect if the DCI is intended for it. This signature or identity may be transmitted explicitly (transmitted data bits) or may be transmitted implicitly (the data part of the DCI is scrambled/masked/colored with an user signature or identity, as in e.g. 3GPP HSDPA).

Alternatively, the DCI does not carry a specific signature or identity, but the receiver can detect if the DCI is intended for it based on at least one of the modulation, coding scheme or coding rate as communication link properties.

Furthermore, the detection can be carried out on the basis of the data content of the DCI, e.g. transport-block size, HARQ or MIMO parameters.

It is noted, that retransmissions may be mapped onto multiple RBs, i.e. each RB candidate essentially represents multiple RBs. Then, either the DCI may be mapped on the RB candidate or it may be mapped starting from the RB candidate in a known format.

Figure 12:
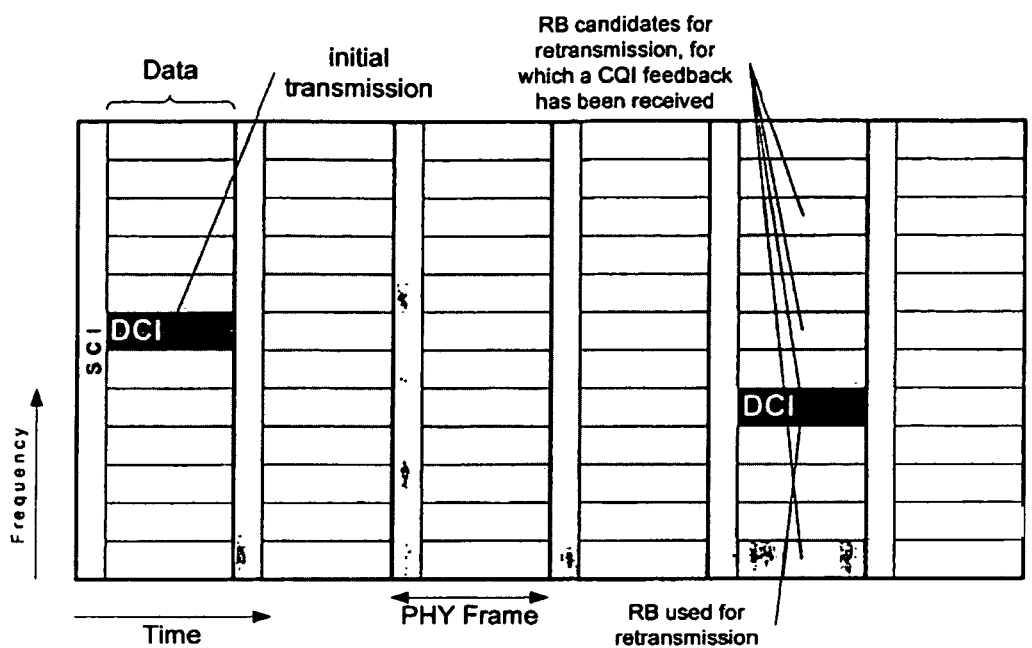
FIG. 12 illustrates an example for resource block candidate definition based on mobile station feedback.
Figure 13:
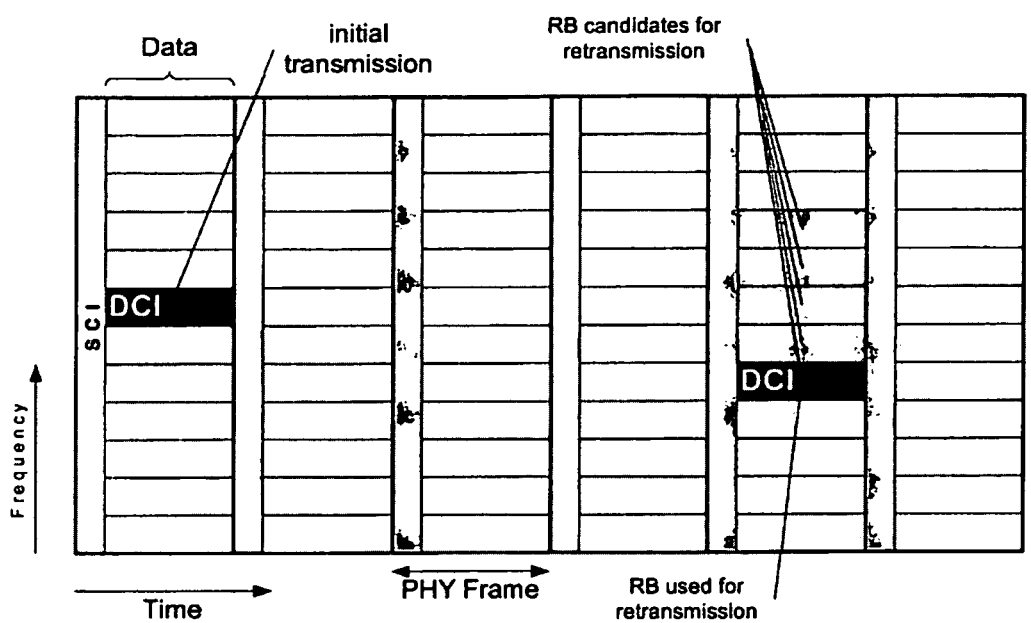
FIG. 13 illustrates an example for localized/vicinity RB candidates.
Figure 14:
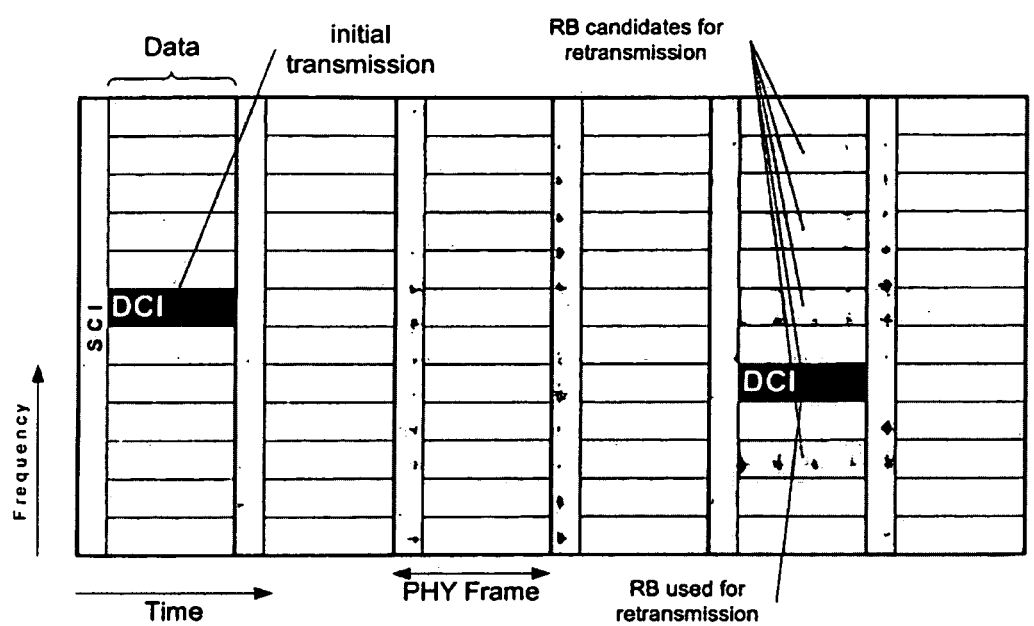
FIG. 14 illustrates an example for distributed RB candidates.

The RB candidates for retransmissions may be defined according to the following policies, where the policies focus on the case that all RB candidates are in the same PHY frame (see also section FIGS. 12-14). However, without loss of generality the policies may be applied to the more general case, where the RB candidates may be on different PHY frames.

RB candidates are defined based on feedback from the user (receiver). In one case, the feedback may be transmitted in a regular manner, e.g. with a defined duty cycle. In another case, the feedback may be triggered by the transmitter (base station), where the trigger either may be an explicit feedback request by the transmitter or may be caused by actual data transmissions (e.g. transmission of a packet). This feedback may be transmitted jointly explicitly or implicitly together with a CQI (Channel Quality Indicator) feedback. Note, that the actual definition of the RB candidates may either directly be indicated by the user, which is then mandatory for the base station, or the user feedback may be interpreted as a recommendation, on which the RB candidate decision of the base station is based upon. In this case, the base station would need to inform and signal the RB candidates to the user. The following examples are given:

The user may feedback the CQI for selected (best) RBs only. Then the RB candidates are based on this selected RBs. An example is shown in FIG. 12.

Alternatively, the user may feedback a joint CQI for multiple RBs only. Then the RB candidates are based on this selected RBs.

As a variant, at a given time instant, the user may feedback a compressed CQI of RBs, e.g. by transformation in time domain by a DCT (Discrete Cosine Transform). Then the RB candidates may be defined based on the best RBs (after reconstructing the CQIs of RBs at the base station).

Figure 1:
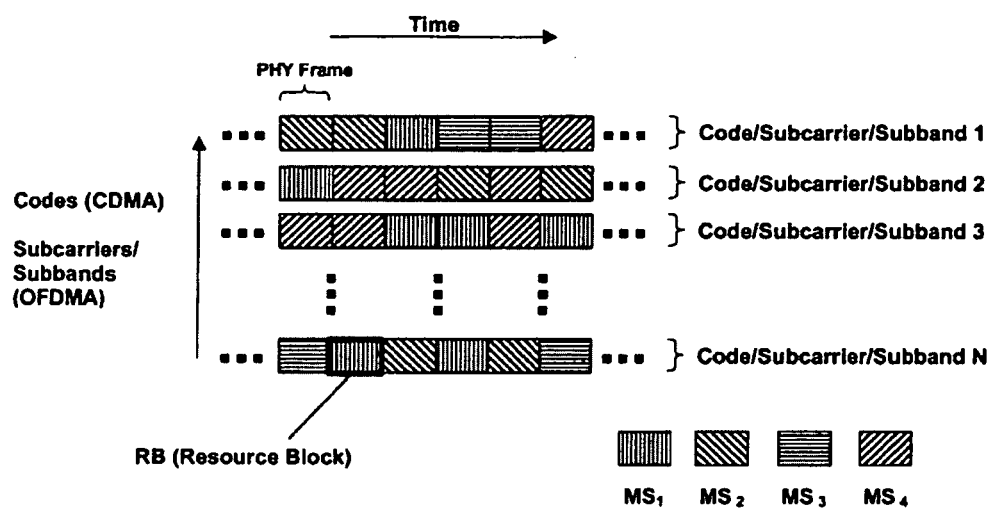
FIG. 1 illustrates an example for packet-scheduling with multiplexing four mobile stations on a SDCH-shared data channel.
Figure 2:
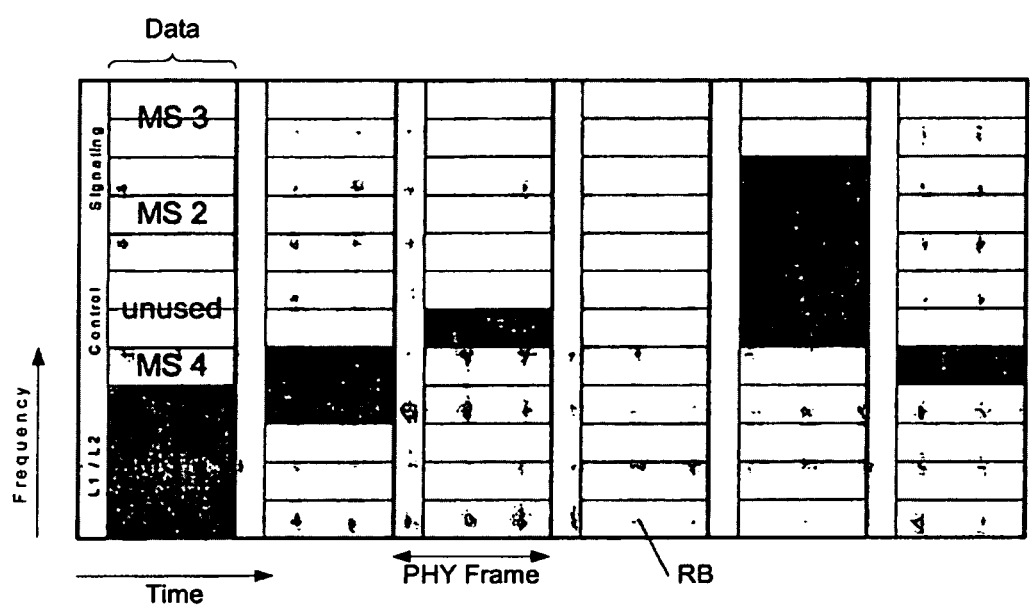
FIG. 2 shows an example for TDS and FDS in the localized mode.
Figure 3:
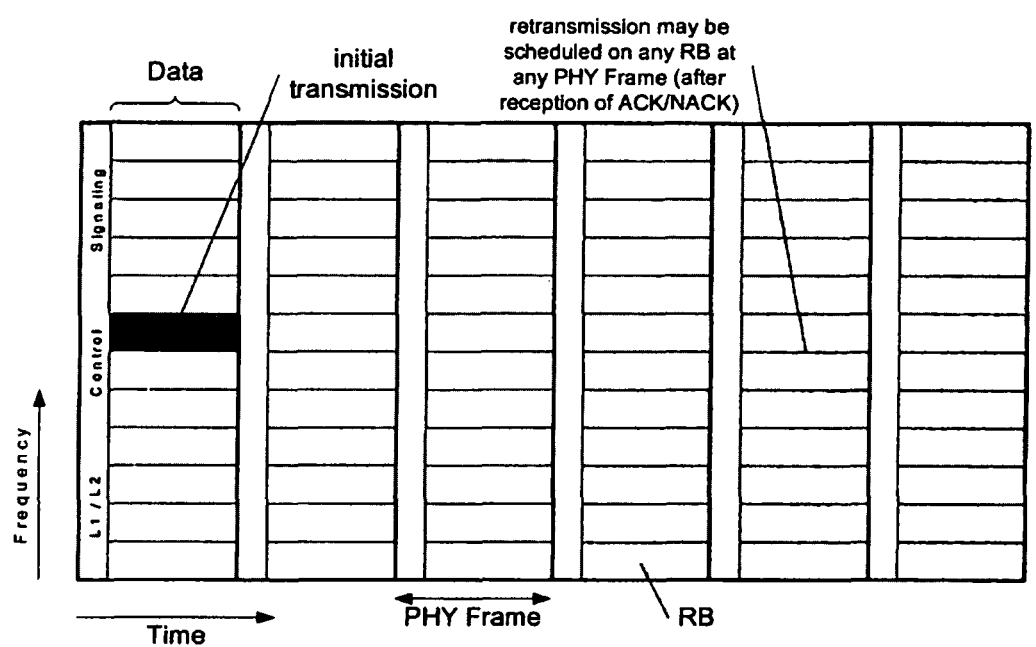
FIG. 3 shows an example for asynchronous ARQ.
Figure 4:
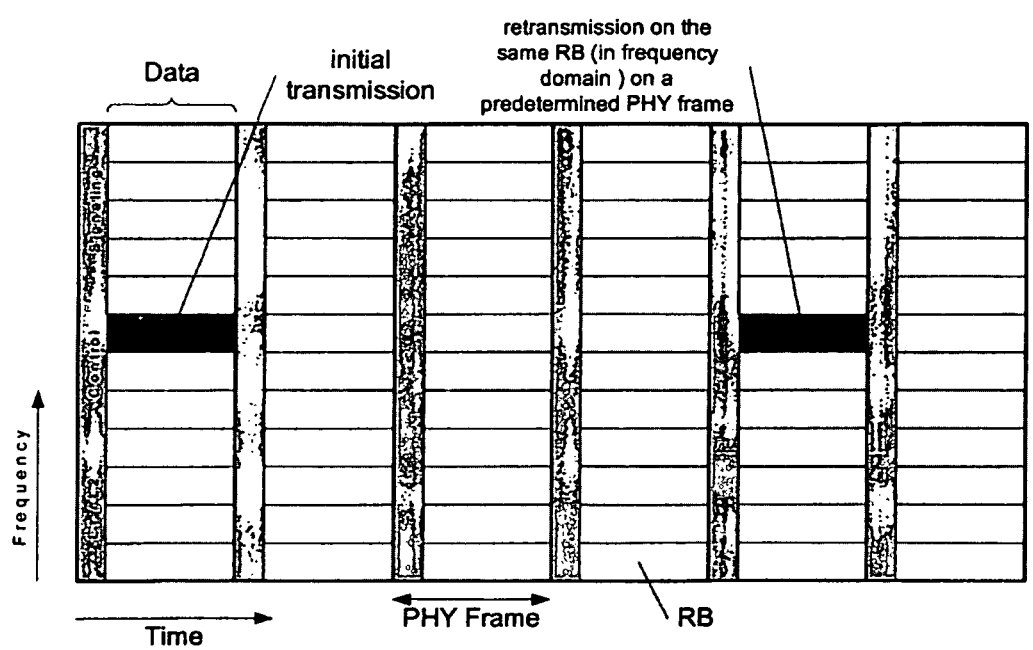
FIG. 4 shows an example for synchronous ARQ with an RTT of four PHY frames.
Figure 5:
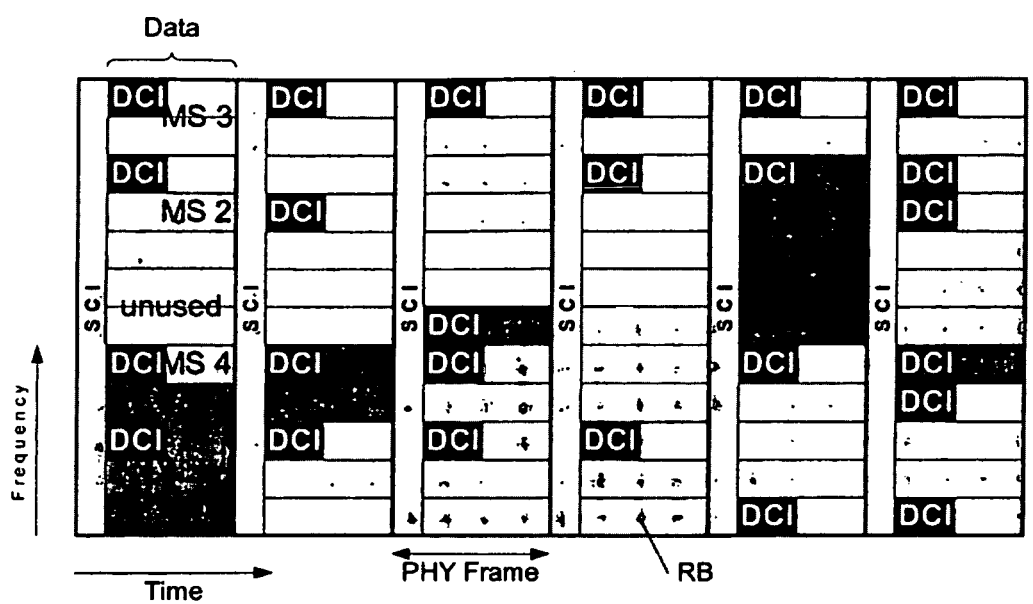
FIG. 5 illustrates an example for SCI and DCI control signaling mapping, wherein the DCIs are mapped onto the data part.
Figure 6:
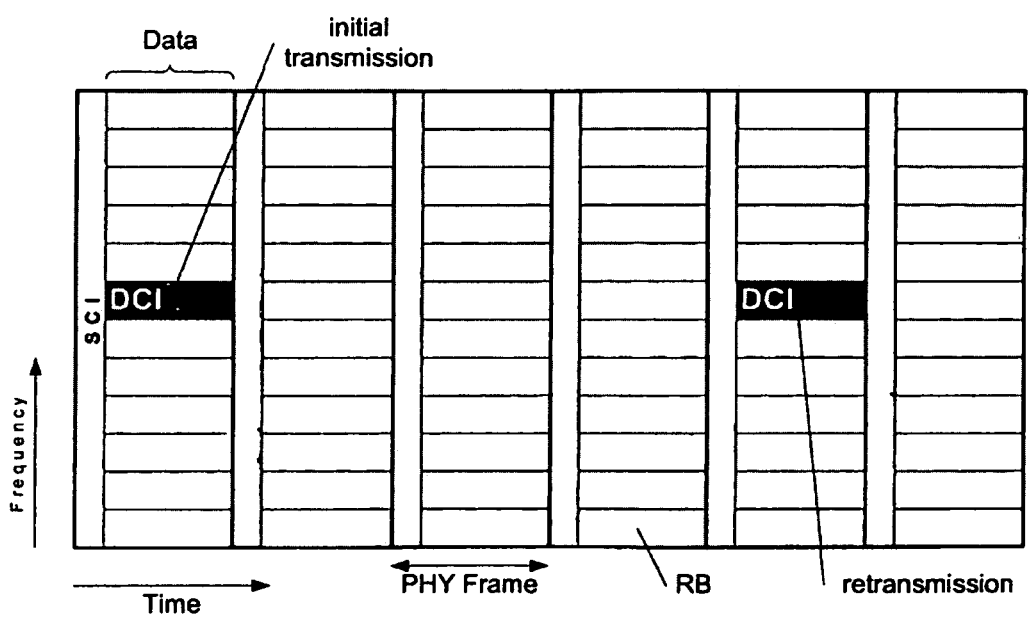
FIG. 6 illustrates an example of SCI/DCI signaling for synchronous ARQ.
Figure 7:
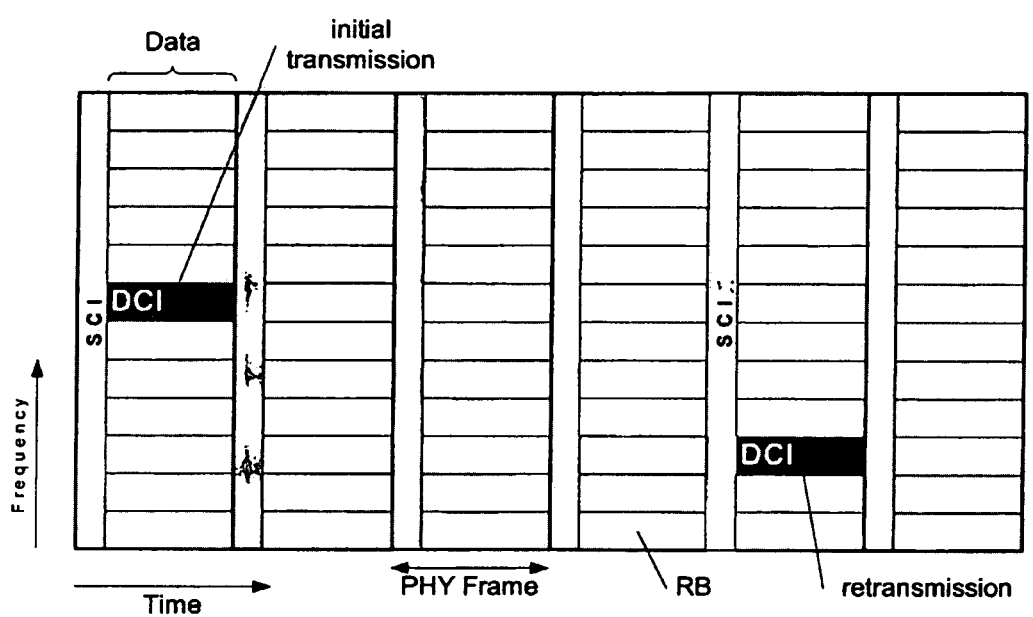
FIG. 7 shows an example SCI/DCI signaling for asynchronous ARQ.
Figure 8:
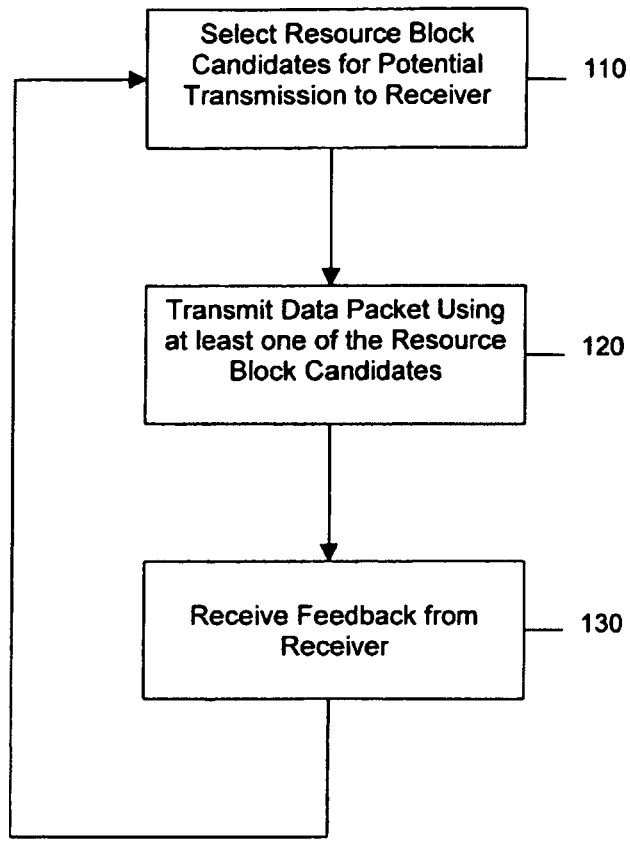
FIG. 8 illustrates a flowchart illustrating the transmission method according to an embodiment of the invention.

Furthermore, as an alternative to the above description with respect to FIG. 8, RB candidates may be furthermore defined depending on the RB(s) on which the previous (re)transmission or the initial transmission has been scheduled. Generally, a packet transmission may be mapped onto a single or onto multiple RBs. This may be either in a localized way or in a distributed way. Generally, this would need to be preconfigured by the network and informed to the mobile station. The following lists some non-exhaustive examples:

a) The initial transmission or previous (re)transmission has been transmitted on RB k, then the retransmissions are transmitted within RBs k±n, i.e. in the vicinity (local band, i.e. localized) of the initial transmission or previous (re)transmission. An example is shown in FIG. 13.

b) The initial transmission or previous (re)transmission has been transmitted on RBs k to k+l, then the retransmissions are transmitted between RBs k−m and l+m, i.e. in the vicinity (local band) of the initial transmission or previous (re)transmission.

c) The initial transmission or previous (re)transmission has been transmitted on RB k, then the retransmissions are transmitted on RBs k±m·n, with m>1 and n=1, 2, . . . , N, i.e. distributed within a given band relative to the initial transmission or previous (re)transmission. An example is shown in FIG. 14.

d) The initial transmission or previous (re)transmission has been transmitted on RBs k to k+l, then the retransmissions are transmitted on RBs k±m·n, with m>1 and n=1, 2, . . . , N, i.e. distributed within a given band relative to the initial transmission or previous (re)transmission.

e) The whole system bandwidth may be segmented into M frequency-blocks, each of which contains $N_m \geq 1$ RBs. If the initial transmission or previous (re)transmission is transmitted on frequency-block m the RB candidates for the retransmission may be only on the frequency-block m. Alternatively, the retransmission RB candidates may be on another frequency-block p≠m, which is preconfigured. Further, either all RBs of a selected frequency-block may be candidates or only selected ones according to the examples given above.

In case the system bandwidth is wider than the bandwidth capability of some mobile stations, segmentation into frequency-blocks is useful. In this case, some mobile stations can only receive selected frequency-blocks. E.g. the system bandwidth is 20 MHz and is divided into 4×5 MHz frequency-blocks, then a mobile station with a bandwidth capability of 5 MHz can only receive one out of 4 frequency-blocks, whereas a mobile station with a bandwidth capability of 10 MHz can receive two adjacent out of 4 frequency-blocks. Naturally, a mobile station with a bandwidth capability of 20 MHz can receive all frequency-blocks.

Furthermore, as an alternative to the above description with respect to FIG. 8, it should be noted that RB candidates may be predefined independent of the RB on which the initial transmission or previous (re)transmission has been transmitted. Generally, this would need to be preconfigured by the network and informed to the mobile station, e.g.

a) RB candidates are preconfigured in a distributed manner, preferably within the band a mobile station can receive.

b) RB candidates are preconfigured in a localized manner, preferably within the band a mobile station can receive.

c) RB candidates are within a preconfigured frequency-block.

Besides the general RB candidate configuration as illustrated above the preferred embodiment is the case when all RB candidates for a given retransmission are in the same PHY frame. Examples are shown in FIG. 12 and FIG. 14.

Compared to the general solution, this has the benefit of potential efficient DRX (Discontinuous Reception) operation. Moreover, this can be implemented like synchronous ARQ, where the retransmissions have a timing relation to earlier transmissions, i.e. the timing of the RB candidates is known to the mobile station and the RB candidates are defined in frequency domain. Note that in this case the scheduling gain for retransmissions is restricted to FDS, which is usually sufficient.

In the following, variants of the above-described illustrative embodiments are described, which are apparent to those skilled in the art.

As a final variant, the DCI in retransmissions may be power adapted with respect to the initial transmission. Depending on other configuration parameters more or less power would be beneficial. Further, the DCI size may be different for retransmissions than for initial transmissions.

Depending on the RB candidate policies defined, the RB candidates for different users may have the following additional properties:

a) The RB candidates overlap as little as possible. In this case the RB candidates are defined such that RB candidates of different users are non-identical. This allows to avoid collisions of retransmissions and shortcomings in resources for retransmissions. In case the total number of available RBs is less than the total number of RB candidates, some RB candidates of different users may overlap. This can be avoided e.g. by reconfiguring the RB candidates such that the total number of RB candidates is less than the total number of RBs. Alliteratively, the RB candidates could be defined such that a minimum overlap exists, where the amount overlapping is similar for all users.

b) The RB candidates for different users overlap as much as possible. This could be seen as a virtual retransmission channel on which a kind of statistical multiplexing of retransmissions takes place. E.g. there are N users in a system and M RB candidates are defined for each user, then these M RB candidates may be identical for all users. Note, that this may not be possible in all cases, since some users may be allocated on different frequency blocks.

c) The RB candidates for different users overlap partially e.g. there are N users in a system and M RB candidates are defined for each user. If M≤N, then these M users may have identical RB candidates, i.e. M users share a kind of virtual retransmission channel.

As a further variation, the concept may also work for the case where the DCI is not mapped on the RB on which the data is scheduled. In this case, the DCI should either indicate implicitly or explicitly the location of the corresponding data part.

The method of the invention may be implemented not only for a retransmissions but already for initial transmissions, i.e. the mobile station would semi-blindly detect already the DCI of the initial transmission and no SCI would be needed at all.

Typically, the semi-blind detection of DCIs on the RB candidates is carried out in a parallel or a serial way. In case of serial semi-blind detection, the mobile station may use smart schemes to order the RB candidates according to priorities, e.g. the mobile station starts with the RB candidate, which has the best actual or reported channel quality or the mobile station starts with the RB candidate, which is closest to the RB of the initial transmission or previous (re)transmission.

Analogue to the preferred embodiment illustrated in FIGS. 12-14, the RB candidates may be on the same RBs in frequency domain, and then are defined in time domain. This allows TDS of retransmissions, but not FDS. Compared to the preferred embodiment, this has the drawbacks of being not synchronous in time and of introducing additional delay.

In a Type I HARQ scheme the method works fine without having the DCI for retransmission, but performing semi-blind detection of the retransmission data. Theoretically, this may also work with Type II/III HARQ schemes, but would lead to large receiver HARQ buffer requirements, since the receiver would need to store the data of all received RB candidates of all failed retransmissions. Further, in a worst case the receiver would need to combine and try decoding all combinations of RB candidates across retransmissions.

The invention claimed is:

1. A method of transmitting data packets over a plurality of dynamically allocated resource units, the unit being a minimum unit for data allocation, in at least one or a combination of a time, code or frequency domain on a shared channel of a wireless communication system, comprising the steps of:
   selecting, from the plurality of dynamically allocated resource units, a number of resource unit candidates to be potentially used for transmission of at least part of the data packets destined for a receiver;
   transmitting to the receiver information related to the selected resource unit candidates, on which the receiver is to attempt to decode dedicated control information (DCI) destined for the receiver, said information being for use by the receiver for said decoding; and
   transmitting the at least part of the data packets and the DCI destined for the receiver to the receiver using only a subset of the selected resource unit candidates, the DCI including modulation and coding information of the data packets and the DCI carrying an identifier of the receiver, wherein the receiver attempts to decode all of the selected resource unit candidates to successfully decode, using the identifier of the receiver, the DCI destined for the receiver and transmitted on said subset,
   wherein the step of transmitting the at least part of the data packets and the DCI includes mapping the DCI at a beginning first part of said subset of the selected resource unit candidates and mapping the at least part of the data packets containing user data at a second part of said subset.

2. The method according to claim 1, wherein at least one of the transmitting steps is an initial or retransmission step in an automatic repeat request protocol.

3. The method according to claim 1, wherein the step of selecting resource unit candidates is based on a feedback signal from the receiver.

4. The method according to claim 1, wherein the step of selecting resource unit candidates is based on a previous transmission.

5. The method according to claim 1, wherein the step of selecting resource unit candidates is based on a pre-configuration determined by the network of the communication system.

6. The method according to claim 1, wherein the step of selecting resource unit candidates is performed in a distributed or localized manner on subcarriers of a frequency band that the receiver can receive.

7. The method according to claim 1, further comprising the step of adapting the transmission power or size of the DCI over a plurality of transmissions.

8. The method according to claim 1, wherein the step of selecting resource unit candidates is performed such that the selected resource unit candidates occupy the same time frame and different frequency subcarriers or different codes.

9. The method according to claim 1, wherein the selecting step involves selecting the resource unit candidates such that the selected resource unit candidates are differently assigned to each user.

10. The method according to claim 1, wherein the transmitting steps comprise mapping a data packet on a single or multiple resource units.

11. A method of decoding data packets received, by a receiver, over a plurality of dynamically allocated resource units, the unit being a minimum unit for data allocation, in at least one or a combination of a time, code or frequency domain on a shared channel of a wireless communication system, the method comprising the steps of:
   receiving information related to resource unit candidates, which are selected by a transmitter and on which the receiver is to attempt to decode dedicated control information (DCI) destined for the receiver, said information being for use by the receiver for said decoding;
   receiving the at least part of the data packets and the DCI destined for the receiver from the transmitter using only a subset of the selected resource unit candidates, the DCI including modulation and coding information of the data packets and the DCI carrying an identifier of the receiver; and
   attempting to decode all of the selected resource unit candidates to successfully decode, using the identifier of the receiver, the DCI destined for the receiver and transmitted on said subset to detect the at least part of the data packets,
   wherein the step of receiving the at least part of the data packets and the DCI includes receiving the DCI that is mapped at a beginning first part of said subset of the selected resource unit candidates and receiving the at least part of the data packets containing user data mapped at a second part of said subset.

12. The method according to claim 11, wherein the decoding step is carried out in a parallel or serial manner with a priority scheme.

13. The method according to one of claim 11, further comprising the step of signaling a feedback message containing information on the resource unit candidates.

14. A transmitter for transmitting data packets over a shared channel of a wireless communication system, the transmitter comprising one or more processors configured to embody sections including:
   a resource allocation section configured to perform dynamic resource allocation using a plurality of resource units, the unit being a minimum unit for data allocation, in at least one or a combination of a time, code or frequency domain;
   a selection section configured to select, from the plurality of resource units, a number of resource unit candidates to be potentially used for transmission of at least part of the data packets destined for a receiver; and
   a transmitting section configured to transmit to the receiver: (i) information related to the selected resource unit candidates, on which the receiver is to attempt to decode dedicated control information (DCI) destined for the receiver, said information being for use by the receiver for said decoding, and (ii) the at least part of the data packets and the DCI destined for the receiver using only a subset of the selected resource unit candidates, the DCI including modulation and coding information of the data packets and the DCI carrying an identifier of the receiver, wherein the receiver attempts to decode all of the selected resource unit candidates to successfully decode, using the identifier of the receiver, the DCI destined for the receiver and transmitted on said subset,
   wherein the transmitting section configured to transmit the at least part of the data packets and the DCI is further configured to map the DCI at a beginning first part of said subset of the selected resource unit candidates and to map the at least part of the data packets containing user data at a second part of said subset.

15. The transmitter according to claim 14, the sections embodied by the one or more processors further including a feedback evaluation section configured to receive feedback from the receiver containing information on the resource unit candidates.

16. A receiver for receiving data packets over a plurality of dynamically allocated resource units, the unit being a minimum unit for data allocation, in at least one or a combination of a time, code or frequency domain over a shared channel of a wireless communication system, the receiver comprising one or more processors configured to embody sections including:
  an information obtaining section configured to obtain information related to resource unit candidates, which are selected by a transmitter and on which the receiver is to attempt to decode dedicated control information (DCI) destined for the receiver, said information being for use by the receiver for said decoding;
  a receiving section configured to receive the at least part of the data packets and the DCI destined for the receiver from the transmitter using only a subset of the selected resource unit candidates, the DCI including modulation and coding information of the data packets and the DCI carrying an identifier of the receiver; and
  a decoder configured to attempt to decode all of the selected resource unit candidates to successfully decode, using the identifier of the receiver, the DCI destined for the receiver and transmitted on said subset to detect the at least part of the data packets,
  wherein the receiving section receives the DCI that is mapped at a beginning first part of said subset of the selected resource unit candidates and receives the at least part of the data packets containing user data mapped at a second part of said subset.

17. The receiver according to claim 16, the sections embodied by the one or more processors further including a feedback signal generating section configured to generate a feedback signal comprising information on the resource unit candidates.

\* \* \* \* \*